United States Patent
Okada et al.

(12) 
(10) Patent No.: US 11,170,235 B2
(45) Date of Patent: Nov. 9, 2021

(54) IMAGE PROCESSING DEVICE AND IMAGE PROCESSING METHOD

(71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 132 days.

(21) Appl. No.: 16/574,507

(22) Filed: Sep. 18, 2019

(65) Prior Publication Data
US 2020/0193190 A1 Jun. 18, 2020

(30) Foreign Application Priority Data
Dec. 14, 2018 (JP) .............................. JP2018-234796

(51) Int. Cl.
*G06K 9/00* (2006.01)
*G06K 9/46* (2006.01)
*G05D 1/02* (2020.01)

(52) U.S. Cl.
CPC ....... *G06K 9/00812* (2013.01); *G05D 1/0246* (2013.01); *G06K 9/4604* (2013.01); *G06K 9/4661* (2013.01); *G05D 2201/0213* (2013.01)

(58) Field of Classification Search
None
See application file for complete search history.

(56) References Cited

U.S. PATENT DOCUMENTS

| | | |
|---|---|---|
| 9,361,529 B2 | 6/2016 | Ryu et al. |
| 9,536,155 B2 | 1/2017 | Takemae |
| 9,721,460 B2 | 8/2017 | Takemura et al. |
| 10,311,731 B1 | 6/2019 | Li et al. |
| 10,373,226 B1 | 8/2019 | Russell et al. |
| 2002/0087253 A1 | 7/2002 | Jeon |

(Continued)

FOREIGN PATENT DOCUMENTS

| | | |
|---|---|---|
| CN | 203318408 U | 12/2013 |
| GN | 102834309 B | 12/2016 |

(Continued)

OTHER PUBLICATIONS

Nov. 12, 2020 Notice of Allowance issued in U.S. Appl. No. 16/574,598.

(Continued)

*Primary Examiner* — Santiago Garcia
(74) *Attorney, Agent, or Firm* — Oliff PLC

(57) ABSTRACT

An image processing device includes: an extraction unit which extracts edge lines based on image data taken by an imaging device by shooting a neighborhood of a vehicle; a selection unit which selects, as a pair of edge lines, edge lines that satisfy a prescribed condition from the extracted edge lines; an exclusion unit which, in a case where a non-paint-out region exists between the pair of edge lines, excludes quasi-edge lines that form the non-paint-out region from the pair of edge lines; and a detection unit which detects a partition line that partitions a parking frame based on the pair of edge lines from which the quasi-edge lines are excluded.

20 Claims, 6 Drawing Sheets

(56) References Cited

U.S. PATENT DOCUMENTS

| | | |
|---|---|---|
| 2003/0128106 A1 | 7/2003 | Ross |
| 2003/0222983 A1 | 12/2003 | Nobori et al. |
| 2004/0254720 A1 | 12/2004 | Tanaka et al. |
| 2006/0080035 A1 | 4/2006 | Daubert et al. |
| 2008/0109120 A1 | 5/2008 | Sawamoto |
| 2009/0243889 A1 | 10/2009 | Suhr et al. |
| 2009/0278709 A1* | 11/2009 | Endo ............ B62D 15/027 340/932.2 |
| 2010/0049402 A1 | 2/2010 | Tanaka |
| 2010/0195901 A1 | 8/2010 | Andrus et al. |
| 2010/0318467 A1 | 12/2010 | Porter et al. |
| 2011/0006917 A1 | 1/2011 | Taniguchi et al. |
| 2013/0027557 A1 | 1/2013 | Hirai et al. |
| 2013/0266188 A1 | 10/2013 | Bulan et al. |
| 2014/0355822 A1 | 12/2014 | Choi et al. |
| 2015/0254981 A1* | 9/2015 | Tachibana ........ G06K 9/00812 340/932.2 |
| 2015/0294163 A1 | 10/2015 | Sakamoto |
| 2015/0317526 A1* | 11/2015 | Muramatsu ....... G06K 9/00798 348/148 |
| 2015/0344028 A1 | 12/2015 | Gieseke et al. |
| 2016/0039409 A1 | 2/2016 | Hayakawa et al. |
| 2016/0093214 A1 | 3/2016 | Wu et al. |
| 2016/0107689 A1 | 4/2016 | Lee |
| 2016/0272244 A1* | 9/2016 | Imai ................ G08G 1/166 |
| 2016/0304088 A1 | 10/2016 | Barth |
| 2017/0032681 A1 | 2/2017 | Tomozawa et al. |
| 2017/0085790 A1 | 3/2017 | Bohn |
| 2018/0012082 A1 | 1/2018 | Satazoda et al. |
| 2018/0095474 A1* | 4/2018 | Batu ............... G01S 19/48 |
| 2018/0099661 A1 | 4/2018 | Bae et al. |
| 2018/0162446 A1 | 6/2018 | Mikuriya et al. |
| 2018/0215413 A1 | 8/2018 | Inagaki |
| 2018/0307919 A1* | 10/2018 | Hayakawa ........... G06T 7/60 |
| 2018/0307922 A1 | 10/2018 | Yoon et al. |
| 2018/0345955 A1* | 12/2018 | Kim ............... B60W 30/06 |
| 2019/0073902 A1 | 3/2019 | Indoh et al. |
| 2019/0075255 A1 | 3/2019 | Matsumoto et al. |
| 2019/0094871 A1* | 3/2019 | Sugano ............ G05D 1/0214 |
| 2019/0370572 A1 | 12/2019 | Nagpal et al. |
| 2020/0062242 A1* | 2/2020 | Hayakawa ........ B62D 15/0285 |
| 2020/0074192 A1* | 3/2020 | Ogata .............. G06K 9/4604 |
| 2020/0104613 A1* | 4/2020 | Hirai ............... G06K 9/50 |
| 2020/0117927 A1* | 4/2020 | Oba .............. B62D 15/0275 |
| 2020/0118310 A1* | 4/2020 | Matsumoto ....... B62D 15/0295 |
| 2020/0175634 A1* | 6/2020 | Aggarwala ........ G06Q 50/30 |
| 2020/0193643 A1 | 6/2020 | Hess et al. |
| 2020/0398827 A1 | 12/2020 | Hara |
| 2021/0180954 A1* | 6/2021 | Hiyokawa ....... G06K 9/00812 |

FOREIGN PATENT DOCUMENTS

| | | |
|---|---|---|
| JP | 2003-032669 A | 1/2003 |
| JP | 2005-300294 A | 10/2005 |
| JP | 2009-288867 A | 12/2009 |
| JP | 2012-176641 A | 9/2012 |
| JP | 2012-221375 A | 11/2012 |
| JP | 2013-001366 A | 1/2013 |
| JP | 2014-106731 A | 6/2014 |
| JP | 2014-146182 A | 8/2014 |
| JP | 2015-104982 A | 6/2015 |
| JP | 2015-185138 A | 10/2015 |
| JP | 2015219774 A | 12/2015 |
| JP | 2017-021747 A | 1/2017 |
| JP | 2017-076275 A | 4/2017 |
| JP | 2017-087758 A | 5/2017 |
| JP | 2018-136695 A | 8/2018 |
| JP | 2018-180941 A | 11/2018 |
| KR | 1020170102192 A | 9/2017 |
| WO | 03058163 A1 | 7/2003 |
| WO | 2005/081941 A2 | 9/2005 |
| WO | 2010116922 A1 | 10/2010 |
| WO | 2014/084118 A1 | 6/2014 |
| WO | 2017/068699 A1 | 4/2017 |

OTHER PUBLICATIONS

Nov. 23, 2020 Office Action issued in U.S. Appl. No. 16/574,462.
K Choeychuen, "Available car parking space detection from webcam by using adaptive mixing features," 2012 Ninth International Joint Conference on Computer Science and Software Engineering (JCSSE) (Year: 2012).
Nov. 30, 2020 Office Action issued in U.S. Appl. No. 16/574,503.
Suhr et al., "Automatic Parking Space Detection and Tracking for Underground and Indoor Environments." IEEE Transactions on Industrial Electronics. (Year: 2016).
K Hamada et al., "Surround View Based Parking Lot Detection and Tracking." IEEE Intelligent Vehicles Symposium. (Year 2015) pp. 1106-1111.
Dec. 3, 2020 Office Action issued in U.S. Appl. No. 16/574,393.
J Suhr et al., "A Universal Vacant Parking Slot Recognition System Using Sensors Mounted on Off-the-Shelf Vehicles." (Year 2018).
Reinhard et al., Photographic Tone Reproduction for Digital Images (2002), ACM Transactions on Graphics, 2, 4, 217-236 (Year: 2002).
Feb. 2, 2021 Office Action issued in U.S. Appl. No. 16/574,422.
U.S. Appl. No. 16/574,395, filed Sep. 18, 2019 in the name of Yasutaka Okada et al.
U.S. Appl. No. 16/574,462, filed Sep. 18, 2019 in the name of Yasutaka Okada et al.
U.S. Appl. No. 16/574,422, filed Sep. 18, 2019 in the name of Yasutaka Okada et al.
U.S. Appl. No. 16/574,598, filed Sep. 18, 2019 in the name of Yasutaka Okada et al.
U.S. Appl. No. 16/574,503, filed Sep. 18, 2019 in the name of Yasutaka Okada et al.
U.S. Appl. No. 16/574,499, filed Sep. 18, 2019 in the name of Yasutaka Okada et al.
U.S. Appl. No. 16/574,529, filed Sep. 18, 2019 in the name of Yasutaka Okada et al.
U.S. Appl. No. 16/574,546, filed Sep. 18, 2019 in the name of Yasutaka Okada et al.
U.S. Appl. No. 16/574,393, filed Sep. 18, 2019 in the name of Yasutaka Okada et al.
U.S. Appl. No. 16/574,391, filed Sep. 18, 2019 in the name of Yasutaka Okada et al.
U.S. Appl. No. 16/574,450, filed Sep. 18, 2019 in the name of Yasutaka Okada et al.
U.S. Appl. No. 16/574,516, filed Sep. 18, 2019 in the name of Yasutaka Okada et al.
Aug. 3, 2020 Office Action Issued in U.S. Appl. No. 16/574,598.
Jun. 30, 2020 Notice of Allowance issued in U.S. Appl. No. 16/574,546.
Sep. 29, 2020 Office Action issued in U.S. Appl. No. 16/574,391.
Sep. 2, 2020 Corrected Notice of Allowability issued in U.S. Appl. No. 16/574,546.
Mar. 30, 2021 Office Action issued in U.S. Appl. No. 16/574,516.
Mar. 19, 2021 Office Action issued in U.S. Appl. No. 16/574,462.
Mar. 19, 2021 Office Action issued in U.S. Appl. No. 16/574,503.
Mar. 25, 2021 Office Action issued in U.S. Appl. No. 16/574,391.
Apr. 9, 2021 Office Action issued in U.S. Appl. No. 16/574,393.
May 19, 2021 Office Action issued in U.S. Appl. No. 16/574,395.
Jun. 24, 2021 Notice of Allowance issued in U.S. Appl. No. 16/574,499.

* cited by examiner

IMAGE PROCESSING DEVICE AND IMAGE PROCESSING METHOD

CROSS-REFERENCE TO RELATED APPLICATIONS

This application is based on and claims priority under 35 USC 119 from Japanese Patent Application No. 2018-234796 filed on Dec. 14, 2018.

TECHNICAL FIELD

The present invention relates to an image processing device and an image processing method.

BACKGROUND ART

Image processing devices are known which detect each partition line such as a white line by detecting edge points where the luminance value varies greatly on the basis of image data taken by shooting a neighborhood of a vehicle and extracting a pair of sets of edge points (refer to JP-A-2009-288867, for example).

SUMMARY OF INVENTION

However, where working lines that were used in drawing partition lines remain, the luminance value varies to a large extent also on the working lines. Thus, in conventional techniques, trouble may occur that working lines are detected as edge points to prevent correct recognition of partition lines.

The present invention has been made in view of the above circumstances and an object of the invention is therefore to provide an image processing device and an image processing method capable of detecting partition lines correctly.

An image processing device according to one mode of an embodiment comprises an extraction unit, a selection unit, an exclusion unit, and a detection unit. The extraction unit extracts edge lines on the basis of image data taken by an imaging device by shooting a neighborhood of a vehicle. The selection unit which selects, as a pair of edge lines, edge lines that satisfy a prescribed condition from the extracted edge lines. If a non-paint-out region exists between the pair of edge lines, the exclusion unit excludes quasi-edge lines that form the non-paint-out region from the pair of edge lines. The detection unit detects a partition line that partitions a parking frame on the basis of the pair of edge lines from which the quasi-edge lines are excluded.

The one mode of the embodiment makes it possible to detect a partition line correctly.

DETAILED DESCRIPTION OF THE INVENTION

An image processing device 1 and an image processing method according to an embodiment will be hereinafter described in detail with reference to the accompanying drawings. The present invention is not limited by the embodiment.

Figure 1A:
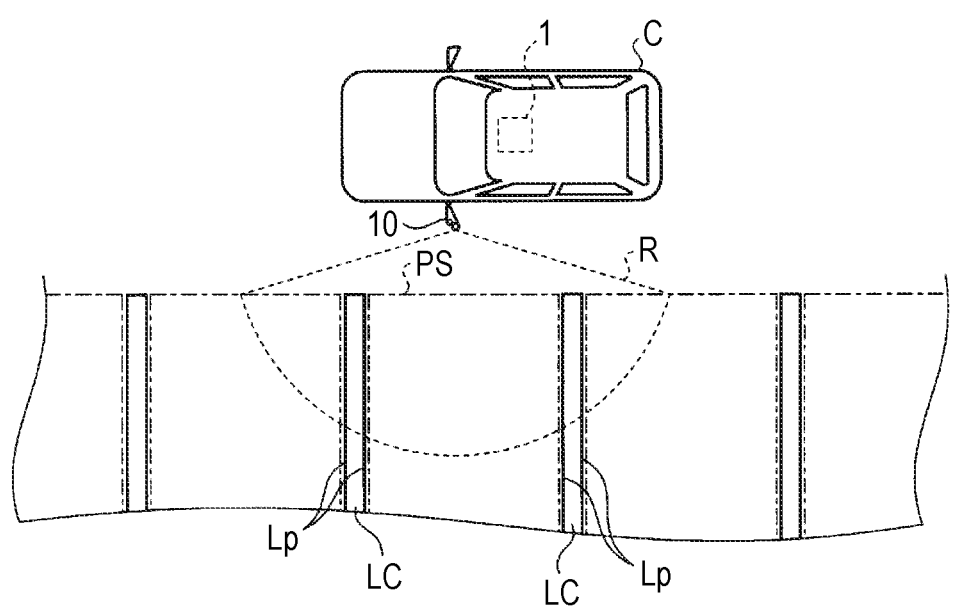
FIG. 1A shows an example manner of installation of an image processing device according to an embodiment.
Figure 1B:
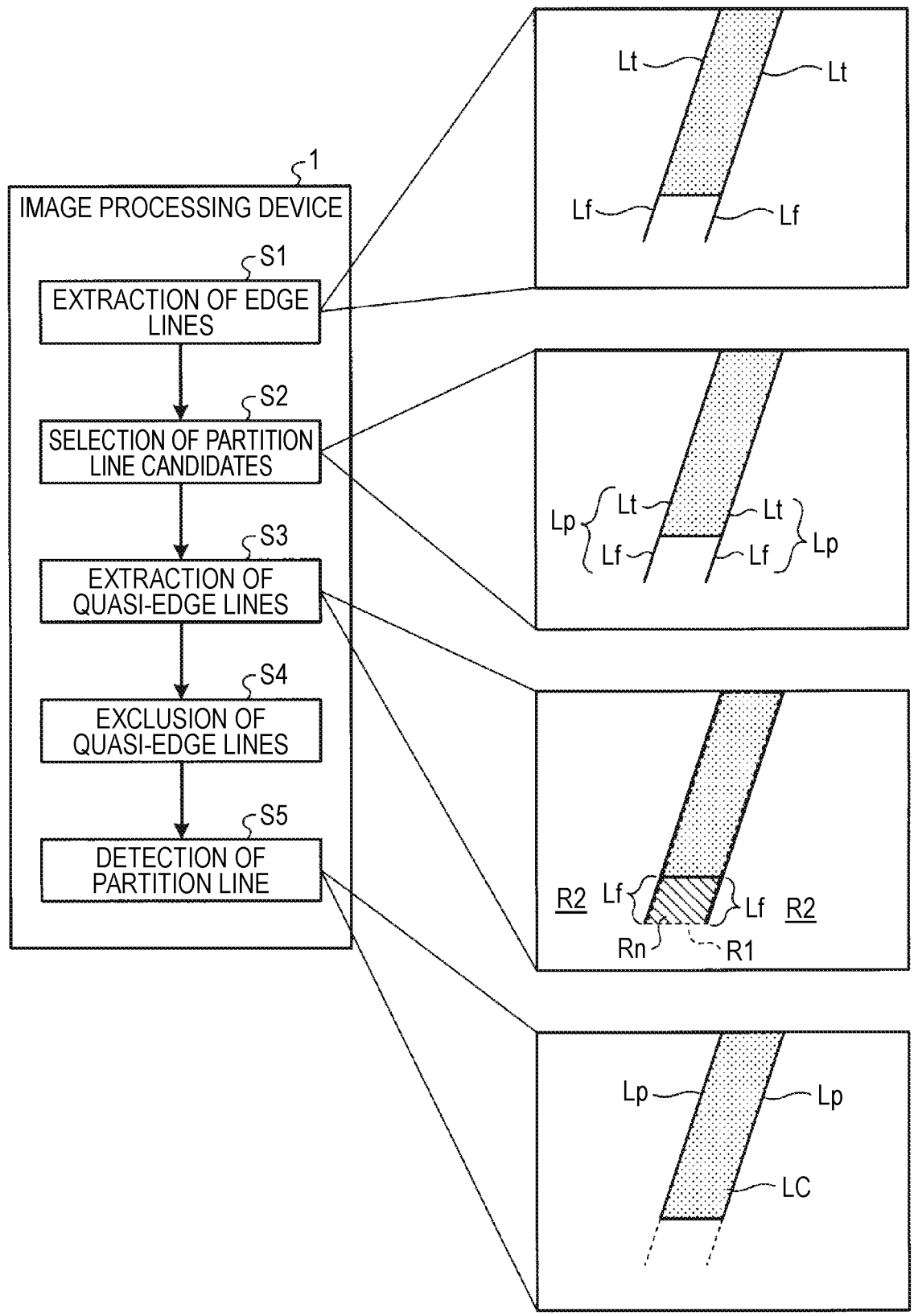
FIG. 1B outlines an image processing method according to the embodiment.

First, the image processing device 1 according to the embodiment will be outlined with reference to FIGS. 1A and 1B. FIG. 1A shows an example manner of installation of the image processing device 1 and FIG. 1B outlines the image processing method. The image processing method is performed by the image processing device 1 shown in FIGS. 1A and 1B.

As shown in FIG. 1A, the image processing device 1 is installed in a vehicle C and detects a parking frame PS on the basis of image data taken by a vehicular camera 10. The parking frame PS is a region that is defined by partition lines LC such as white lines drawn on a road surface and is a space where to park the vehicle C.

Equipped with an imaging device such as a CCD (charge-coupled device) or a CMOS (complementary metal-oxide-semiconductor) sensor, each vehicular camera 10 shoots a neighborhood of the vehicle C. The lens system of each vehicular camera 10 employs a wide-angle lens such as a fisheye lens and has an imaging range R as shown in FIG. 1A.

Although in the example of FIG. 1A the vehicular camera 10 is a left side camera for shooting a left side area around the vehicle C, plural vehicular cameras 10 are installed which include a front camera for shooting an area in front of the vehicle C, a rear camera for shooting an area in the rear of the vehicle C, and a right side camera for shooting a right side area around the vehicle C.

To detect a parking frame PS, the image processing device 1 detects partition lines LC such as white lines drawn on a road surface on the basis of image data taken by a vehicular camera 10. The image processing device 1 detects a parking frame PS on the basis of information relating to the detected partition lines LC.

More specifically, first, the image processing device 1 extracts edge lines each of which is a connection of edge points that are extracted on the basis of luminance values of respective pixels of the image data. The image processing device 1 detects, from the extracted edge lines, as an edge line pair Lp (hereinafter referred to as "partition line candidates"), a pair of edge lines that satisfy a prescribed condition. More specifically, the image processing device 1 detects, from the extracted edge lines, as partition line candidates Lp, a pair of edge lines that are approximately parallel with each other and have an interval that is within a prescribed range corresponding to the width of partition lines LC. That is, a pair of edge lines corresponding to left and right end lines, in the width direction, of a partition line LC such as a white line are partition line candidates Lp.

Then the image processing device 1 detects, as partition lines LC, two pairs of partition line candidates Lp that are arranged parallel with each other with a prescribed interval. More specifically, the image processing device 1 detects, as each partition line LC, a region defined by a pair of edge lines that constitute partition line candidates Lp. The prescribed interval is the width of a standard parking region for common or public use that is prescribed in, for example, a law relating to parking lots.

Subsequently, the image processing device 1 detects a parking frame PS on basis of the two partition lines LC that are arranged parallel with each other with the prescribed interval. That is, the image processing device 1 detects, as a parking frame PS where the vehicle C can be parked actually, a space that is defined between the inside edge lines of the two partition lines LC.

However, where working lines that were used in drawing partition lines LC remain on a road surface, edge points are detected at the boundary between each working line and the road surface and edge lines are extracted so as to include edge points corresponding to the working lines. The working lines are, for example, auxiliary lines to serve as rough measures to be used for drawing straight partition lines LC and are drawn as straight lines.

Thus, where working lines remain on the road surface, an edge line Lt corresponding to a partition line LC and an edge line Lf corresponding to a working line may be extracted continuously. In this case, an erroneous partition line LC is detected as including the working line. This results in erroneous detection of a parking frame PS.

A partition line LC and a working line are different from each other in that whereas the partition line LC is painted out with, for example, white paint, the region interposed between working lines are not. In view of this, based on this difference, the image processing device 1 according to the embodiment detects a partition line LC by excluding edge lines Lf corresponding to working lines from partition line candidates Lp, respectively.

More specifically, as shown in FIG. 1B, at step S1 the image processing device 1 extracts edge lines on the basis of image data taken by a vehicular camera 10. Where working lines remain, edge lines Lt corresponding to a partition line LC and edge lines Lf corresponding to working lines may be detected continuously from the image data. FIG. 1B shows a tip portion of a partition line LC. In FIG. 1B, for convenience of description, the partition line LC is drawn by dots, a non-paint-out region Rn is hatched, and an inside region R1 is surrounded by broken lines.

At step S2, the image processing device 1 selects partition line candidates Lp on the basis of the extracted edge lines. In this example, since each edge line Lt and the corresponding edge line Lf are continuous with each other, they are extracted so as not to be discriminated from each other and an edge line including each edge line Lt and the corresponding edge line Lf is selected as a partition line candidate Lp.

At step S3, the image processing device 1 extracts, as quasi-edge lines, edge lines that form a region (hereinafter referred to as a "non-paint-out region Rn") for which the luminance value difference between a luminance value of an inside region R1 between the partition line candidates Lp and a luminance value of one of outside regions R2 each of which is located on the opposite side of the corresponding edge line constituting a partition line candidate Lp to the inside region R1 is smaller than a preset, prescribed luminance value difference (first prescribed luminance value difference or second prescribed luminance value difference). The quasi-edge lines are the edge lines Lf corresponding to the respective working lines. In the following, the quasi-edge lines will be given the symbol "Lf."

At step S4, the image processing device 1 excludes the quasi-edge lines Lf from the respective partition line candidates Lp. At step S5, the image processing device 1 detects a partition line LC on the basis of the partition line candidates Lp from which the quasi-edge lines Lf have been excluded. As a result, the image processing device 1 can detect a partition line LC in which the quasi-edge lines Lf corresponding to the working lines are excluded and hence can detect a partition line LC correctly.

Figure 2:
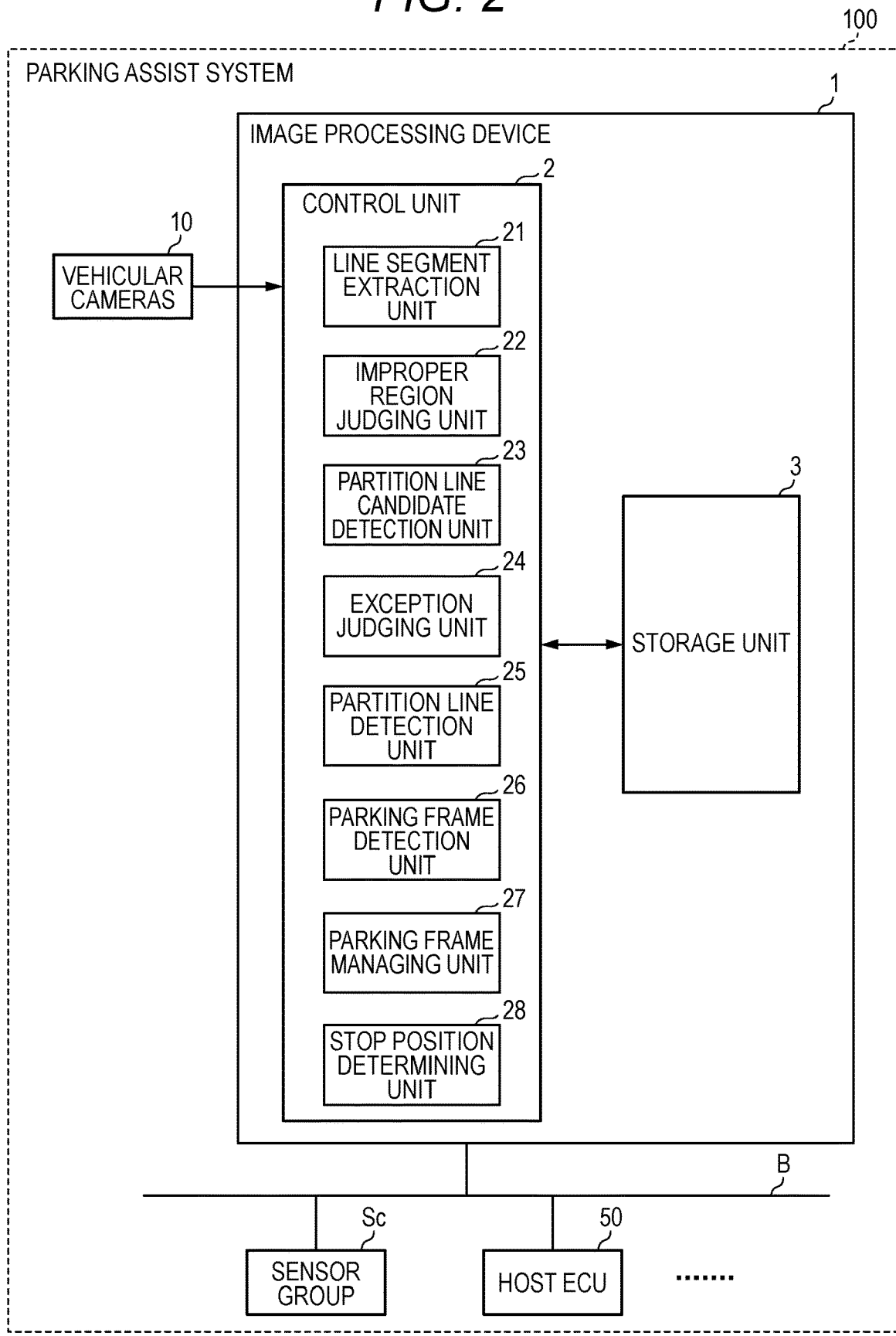
FIG. 2 is a block diagram of a parking support system including the image processing device according to the embodiment.

Next, an example configuration of the image processing device 1 according to the embodiment will be described with reference to FIG. 2. FIG. 2 is a block diagram of a parking assist system 100 including the image processing device 1. As shown in FIG. 2, the parking assist system 100 is equipped with the image processing device 1, vehicular cameras 10, a sensor group Sc, and a host ECU (electronic control unit) 50. As shown in FIG. 2, the image processing device 1, the sensor group Sc, and the host ECU 50 can communicate with each other via a communication bus B of the communication standard of CAN (Control Area Network) communication.

The sensor group Sc, which consists of various kinds of sensors for detecting a running state of the vehicle C, communicates detected sensor values to the image processing device 1. The sensor group Sc includes a vehicle speed sensor for detecting a rotation speed of wheels of the vehicle C, a steering angle sensor for detecting a steering angle of the vehicle C, etc.

The host ECU 50, which is, for example, a CPU for assisting automatic parking of the vehicle C, parks the vehicle C based on a parking frame PS detected by the image processing device 1. Being, for example, an EPS (electric power steering)-ECU for controlling the steering angle of the vehicle C, the host ECU 50 can control the steering angle so that the vehicle C is parked in a parking frame PS detected by the image processing device 1. The host ECU 50 may include ECUs for accelerator control and braking control.

As shown in FIG. 2, the image processing device 1 is equipped with a control unit 2 and a storage unit 3. The control unit 2 is equipped with a line segment extraction unit 21 (an example of the term "extraction unit" used in the claims), an improper region judging unit 22, a partition line candidate detection unit 23 (an example of the term "selection unit" used in the claims), an exception judging unit 24, a partition line detection unit 25, a parking frame detection unit 26, a parking frame managing unit 27, and a stop position determining unit 28.

For example, the control unit 2 includes a computer having a CPU (central processing unit), a ROM (read-only memory), a RAM (random access memory), an HDD (hard disk drive), an input/output port, etc., and other various kinds of circuits.

For example, the CPU of the computer functions as the line segment extraction unit 21, the improper region judging unit 22, the partition line candidate detection unit 23, the exception judging unit 24, the partition line detection unit 25, the parking frame detection unit 26, the parking frame managing unit 27, and the stop position determining unit 28 of the control unit 2 by reading out programs stored in the ROM and running them.

All or part of the line segment extraction unit 21, the improper region judging unit 22, the partition line candidate detection unit 23, the exception judging unit 24, the partition line detection unit 25, the parking frame detection unit 26, the parking frame managing unit 27, and the stop position determining unit 28 can be implemented as hardware such as an ASIC (application-specific integrated circuit) or an FPGA (field-programmable gate array).

For example, the storage unit 3 corresponds to the RAM and the HDD. The RAM and the HDD can store various kinds of information and the information of various kinds of programs. The image processing device 1 may be configured so as to acquire the various kinds of information and programs from a portable recording medium or another computer that is connected to it by wire or wirelessly via a network.

For example, the control unit 2 may execute a parking frame PS detection process either in the case where the vehicle C is considered to be running in a parking lot (e.g., the vehicle speed is lower than or equal to 30 km/h) or during all the period when the vehicle C is running.

The line segment extraction unit 21 extracts edge points on the basis of luminance values of respective pixels from image data received from a vehicular camera 10 and extracts edge lines each of which is a connection of edge points. More specifically, the line segment extraction unit 21 converts the image data received from the vehicular camera 10 into grayscale image data. Grayscaling is processing of converting the value of each pixel of image data into one of prescribed gradation levels of white to black (e.g., 256 gradation levels) according to its luminance.

Then the line segment extraction unit 21 calculates edge intensity and a luminance gradient of each pixel by, for example, applying a Sobel filter to the grayscale image data. The line segment extraction unit 21 thereafter extracts edge points by extracting pixels whose edge intensity values exceed a prescribed intensity value and extracts an edge line by connecting adjacent edge points.

The line segment extraction unit 21 communicates edge information relating to the extracted edge points and edge lines to the improper region judging unit 22.

The improper region judging unit 22 judges, on the basis of the extracted edge points and edge lines, presence/absence of an improper region where detection of a partition line to constitute a parking frame is difficult. For example, the improper region judging unit 22 determines, as an improper region, an unpaved road surface region (e.g., graveled region) and a grating region where more edge points are detected than from a paved road surface.

More specifically, the improper region judging unit 22 can judge, as an improper region, a region where the density of edge points is higher than a preset, prescribed density and luminance gradients of respective edge points are not uniform. The improper region judging unit 22 eliminates edge information of the improper region from the above-mentioned edge information on the basis of the thus-determined improper region and passes resulting information to the downstream stage.

The partition line candidate detection unit 23 detects partition line candidates, that is, candidates for lines to constitute partition lines LC to partition a parking frame PS, by selecting them on the basis of the edge lines extracted by the line segment extraction unit 21. The partition line detection unit 23 generates information relating to the detected partition line candidates Lp and communicates the generated information to the exception judging unit 24.

The partition line candidate detection unit 23 can perform the processing of detecting partition line candidates Lp in such a manner as to eliminate the improper region detected by the improper region judging unit 22. In other words, the partition line candidate detection unit 23 does not perform the partition line candidate detection processing for the improper region. This makes it possible to reduce the processing load of the control unit 2.

The exception judging unit 24 judges presence/absence of a parking prohibition region where parking of the vehicle C is not permitted, on the basis of the partition line candidates Lp detected by the partition line candidate detection unit 23. For example, the exception judging unit 24 judges presence/absence of a parking prohibition region such as a zebra zone (vehicle guiding zone).

More specifically, where it is assumed that partition line candidates Lp that are approximately parallel with each other constitute each partition line LC, the exception judging unit 24 judges that the region defined by thus-assumed partition lines LC is a parking prohibition region if three or more partition line candidates that are inclined with respect to each assumed partition line LC exist at prescribed intervals.

The exception judging unit 24 can judge presence/absence of a partition line candidates Lp that are not necessary for detection of a parking frame PS. For example, the exception judging unit 24 can detect a road surface marking contained in image data by matching partition line candidates Lp detected by the partition line candidate detection unit 23 with template models of road surface markings.

The exception judging unit 24 eliminates unnecessary partition line candidates LP from the information relating to the partition line candidates Lp, adds information indicating the parking prohibition region to information relating to resulting partition line candidates Lp, and communicates the resulting information to the parking frame detection unit 26.

The partition line detection unit 25 detects partition lines LC on the basis of the partition line candidates Lp detected by the partition line candidate detection unit 23. The partition line detection unit 25 will be described later. The partition line detection unit 25 detects partition lines LC on the basis of partition line candidates Lp from which quasi-edge lines Lf corresponding to working lines have been excluded.

The parking frame detection unit 26 detects a parking frame on the basis of the partition lines LC detected by the partition line detection unit 25. The parking frame detection unit 26 can detect a parking frame PS so as to avoid the region that has been judged to be the parking prohibition region.

That is, the parking frame detection unit 26 can detect a parking frame PS so as to exclude a zebra zone or the like. Upon detecting the parking frame PS, the parking frame detection unit 26 communicates parking frame information relating to the detected parking frame PS to the parking frame managing unit 27. Each piece of partition line information includes apex coordinates of each partition line with reference to the vehicle C.

The parking frame managing unit 27 manages, in time series, partition frame information of the parking frame PS detected by the parking frame detection unit 26. The parking frame managing unit 27 can estimate a movement distance of the vehicle C on the basis of sensor values received from the sensor group Sc and estimate current apex coordinates of each partition line LC on the basis of the estimated movement distance and past partition frame information.

Furthermore, the parking frame managing unit 27 can update the coordinate information of each partition line LC of past partition frame information on the basis of newly received partition frame information. That is, the parking frame managing unit 27 updates the relative positional relationship between the vehicle C and the parking frame PS at such occasions as the vehicle C moves.

Still further, it is also possible for the parking frame managing unit 27 to set a parking frame detection range with an assumption that plural parking frames PS are arranged continuously. For example, the parking frame managing unit 27 employs, as a reference parking frame PS, one parking frame PS detected by the parking frame detection unit 26 and assumes that plural parking frames PS exist so as to be continuous the reference parking frame PS.

And the parking frame managing unit 27 sets the thus-assumed range of the plural parking frames as a detection range. With this measure, it suffices for the above-described line segment extraction unit 21 to perform edge line detection processing only for the detection range set by the parking frame managing unit 27, whereby the processing load of the control unit 2 can be reduced.

The stop position determining unit 28 determines a stop position of the vehicle C, that is, a parking position in the parking frame PS, on the basis of the parking frame information and the edge information. For example, the stop position determining unit 28 determines a stop position of the vehicle C by detecting a sprag(s) or curb, a wall, a white line extending in the vehicle width direction, or the like on the basis of the edge lines detected by the line segment extraction unit 21.

When detecting sprags, the stop position determining unit 28 determines a stop position so that the bottom portions of the rear wheels of the vehicle C will be located just in front of the respective sprags. When detecting a white line, a wall, or the like rather than sprags, the stop position determining unit 28 determines a stop position so that the rear end (e.g., the end of the rear bumper) will be located just in front of it.

Figure 3:
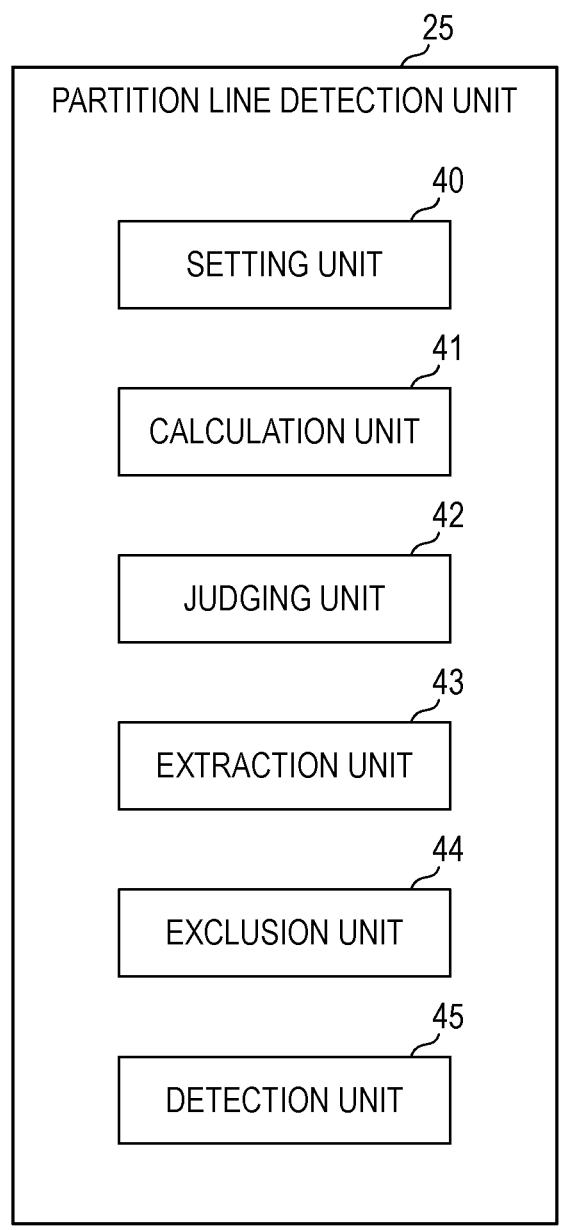
FIG. 3 is a block diagram of a partition line detection unit.

Next, an example configuration of the partition line detection unit 25 will be described with reference to FIG. 3. FIG. 3 is a block diagram of the partition line detection unit 25. The partition line detection unit 25 detects partition lines LC on the basis of information relating to partition line candidates Lp. The partition line detection unit 25 detects partition lines LC in such a manner as to exclude quasi-edge lines Lf corresponding to working lines from the partition line candidates Lp.

The partition line detection unit 25 is equipped with a setting unit 40, a calculation unit 41, a judging unit 42, an extraction unit 43, an exclusion unit 44, and detection unit 45.

The setting unit 40 sets an inside position PA in an inside region R1 that is a region between partition line candidates Lp and sets outside positions PB and PC in respective outside regions R2 each of which is located on the opposite side of each edge line constituting a partition line candidate Lp to the inside region R1.

The setting unit 40 sets the inside position PA and the outside positions PB and PC on a straight line that is perpendicular to the partition line candidates Lp. The setting unit 40 sets the inside position PA and the outside positions PB and PC while moving the straight line that is perpendicular to the partition line candidates Lp from the side of the vehicle C by a prescribed interval each time. The prescribed interval is a preset interval, for example, several pixels.

The setting unit 40 sets the inside position PA and the outside positions PB and PC while moving the position of the straight line that is perpendicular to the partition line candidates Lp by the prescribed interval each time toward the side opposite to the vehicle C until the inside position PA goes out of a non-paint-out region Rn.

The setting unit 40 sets the inside position PA at a middle position between the partition line candidates Lp. The setting unit 40 sets the outside position PB in one of the two outside regions R2 which are located outside the inside region R1 and sets the outside position PC in the other outside region R2.

The setting unit 40 sets the outside positions PB and PC so that they are distant from the inside region R1 by a preset, prescribed distance that is, for example, ½ of the distance between the partition line candidates Lp (i.e., the width of a partition line LC).

Figure 4:
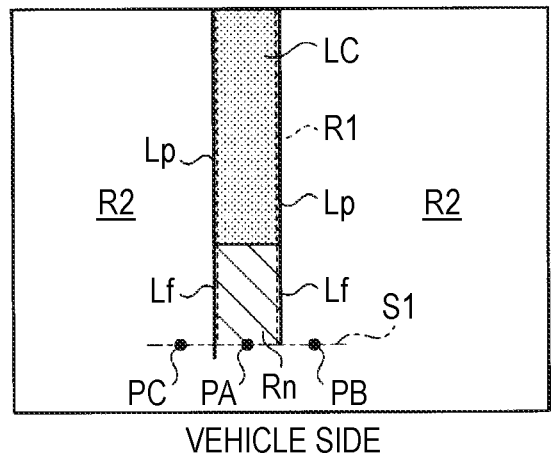
FIG. 4 is a schematic diagram showing an inside position PA and outside positions
Figure 4:
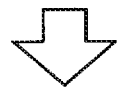
Figure 4:
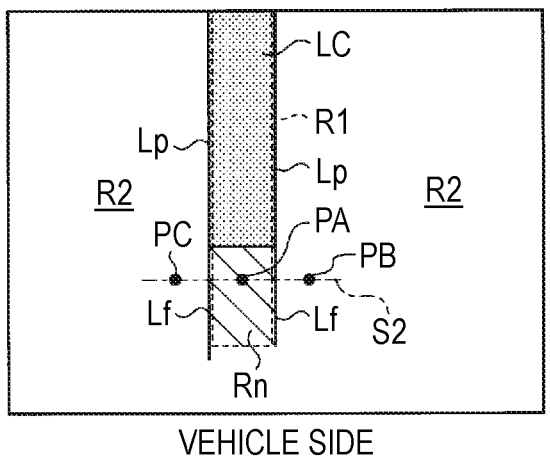
Figure 4:
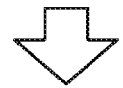
Figure 4:
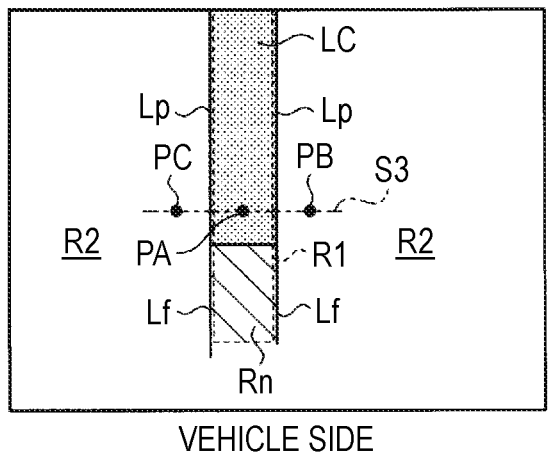

A description will now be made of a method for setting an inside position PA and outside positions PB and PC. FIG. 4 is a schematic diagram showing an inside position PA and outside positions PB and PC. In FIG. 4, for convenience of description, an actual partition line LC is drawn by dots, a non-paint-out region Rn is hatched, and an inside region R1 is surrounded by broken lines.

The setting unit 40 sets the initial position of a straight line that is perpendicular to partition line candidates Lp at such a position S1 that the straight line crosses two edge lines that constitute the partition line candidates Lp and is closest to the vehicle C. And the setting unit 40 sets an inside position PA and outside positions PB and PC on this straight line.

When the straight line is located at the position S1, the inside position PA is inside the non-paint-out region Rn. Thus, the setting unit 40 sets a new straight line at a position S2 that is distant from the position S1 by a prescribed interval and is located on the opposite side of the position S1 to the vehicle C. And the setting unit 40 sets an inside position PA and outside positions PB and PC on the new straight line.

When the straight line is located at the position S2, the inside position PA is still inside the non-paint-out region Rn. Thus, the setting unit 40 again sets a new straight line at a position S3 that is distant from the position S2 by the prescribed interval and is located on the opposite side of the position S2 to the vehicle C. And the setting unit 40 sets an inside position PA and outside positions PB and PC on the new straight line.

When the straight line is located at the position S3, the inside position PA is outside the non-paint-out region Rn. Thus, the setting unit 40 finishes the setting of an inside position PA and outside positions PB and PC.

Returning to FIG. 3, the calculation unit 41 calculates an edge score of each of the two edge lines that constitute the respective partition line candidates Lp. The edge score is the average of luminance values of the respective edge points of each of the two edge lines that constitute the respective partition line candidates Lp.

The calculation unit 41 calculates luminance value differences between a luminance value at the inside position PA and luminance values at the respective outside positions PB and PC. More specifically, the calculation unit 41 calculates a luminance value difference (called a "first luminance value difference") between the luminance value at the inside position PA and the luminance value at the outside position PB and a luminance value difference (called a "second luminance value difference") between the luminance value at the inside position PA and the luminance value at the outside position PC. The luminance value differences are absolute values.

The judging unit 42 judges whether the inside position PA is located inside the non-paint-out region Rn on the basis of the calculated luminance value differences. More specifically, the judging unit 42 judges that the inside position PA is located inside the non-paint-out region Rn if the first luminance value difference is smaller than a first prescribed luminance value difference or the second luminance value difference is smaller than a second prescribed luminance value difference. The judging unit 42 judges that the inside position PA is located outside the non-paint-out region Rn if the first luminance value difference is larger than or equal to the first prescribed luminance value difference and the second luminance value difference is larger than or equal to the second prescribed luminance value difference.

The first prescribed luminance value difference is an edge score of the edge line that is located between the inside position PA and the outside position PB and constitutes the partition line candidate Lp located there. The second prescribed luminance value difference is an edge score of the edge line that is located between the inside position PA and the outside position PC and constitutes the partition line candidate Lp located there.

If judging that the inside position PA is located outside the non-paint-out region Rn, the judging unit 42 judges that the portions, closer to the vehicle C than the straight line on which the inside position PA and the outside positions PB and PC are set is, of the edge lines constituting the respective partition line candidates Lp are quasi-edge lines Lf.

That is, if having judged at the preceding step that the inside position PA was located inside the non-paint-out region Rn and judging at the current step that the inside position PA is located outside the non-paint-out region Rn, the judging unit 42 judges that the portions, closer to the vehicle C than the straight line including the inside position PA at the current step is, of the edge lines constituting the respective partition line candidates Lp are quasi-edge lines Lf.

The extraction unit 43 extracts the quasi-edge lines Lf from the edge lines constituting the respective partition line candidates Lp. If judging at the current step that the inside position PA is located outside the non-paint-out region Rn, the extraction unit 43 extracts, as quasi-edge lines Lf, the portions, closer to the vehicle C than the straight line including the inside position PA at the current step is, of the edge lines constituting the respective partition line candidates Lp. In this manner, the extraction unit 43 can extract edge lines corresponding to the working lines as quasi-edge lines Lf reliably.

The exclusion unit 44 excludes the extracted quasi-edge lines Lf from the edge lines constituting the respective partition line candidates Lp. That is, the exclusion unit 44 excludes, from the edge lines constituting the respective partition line candidates Lp, the quasi-edge lines Lf that form the non-paint-out region Rn if the luminance value difference between the luminance value at the inside position PA inside the non-paint-out region Rn and the luminance value at the corresponding outside position PB or PC is smaller than a prescribed luminance value difference. More specifically, the exclusion unit 44 excludes, from the edge lines constituting the respective partition line candidates Lp, the quasi-edge lines Lf that form the non-paint-out region Rn where the luminance value difference between the luminance value at the inside position PA and the luminance values at the outside position PB is smaller than the first prescribed luminance value difference or the luminance value difference between the luminance value at the inside position PA and the luminance values at the outside position PC is smaller than the second prescribed luminance value difference. In this manner, the exclusion unit 44 can exclude the edge lines Lf corresponding to the respective working lines from the edge lines constituting the respective partition line candidates Lp.

The detection unit 45 detects a partition line LC on the basis of those portions of the partition line candidate Lp that were not excluded by the exclusion unit 44.

As described above, the partition line detection unit 25 extracts, as quasi-edge lines Lf, edge lines corresponding to working lines and extracts a partition line LC on the basis of partition line candidates Lp from which the working lines are excluded. As a result, the partition line detection unit 25 can detect a partition line LC from which the working lines are excluded and hence detect a partition lines LC correctly.

Figure 5:
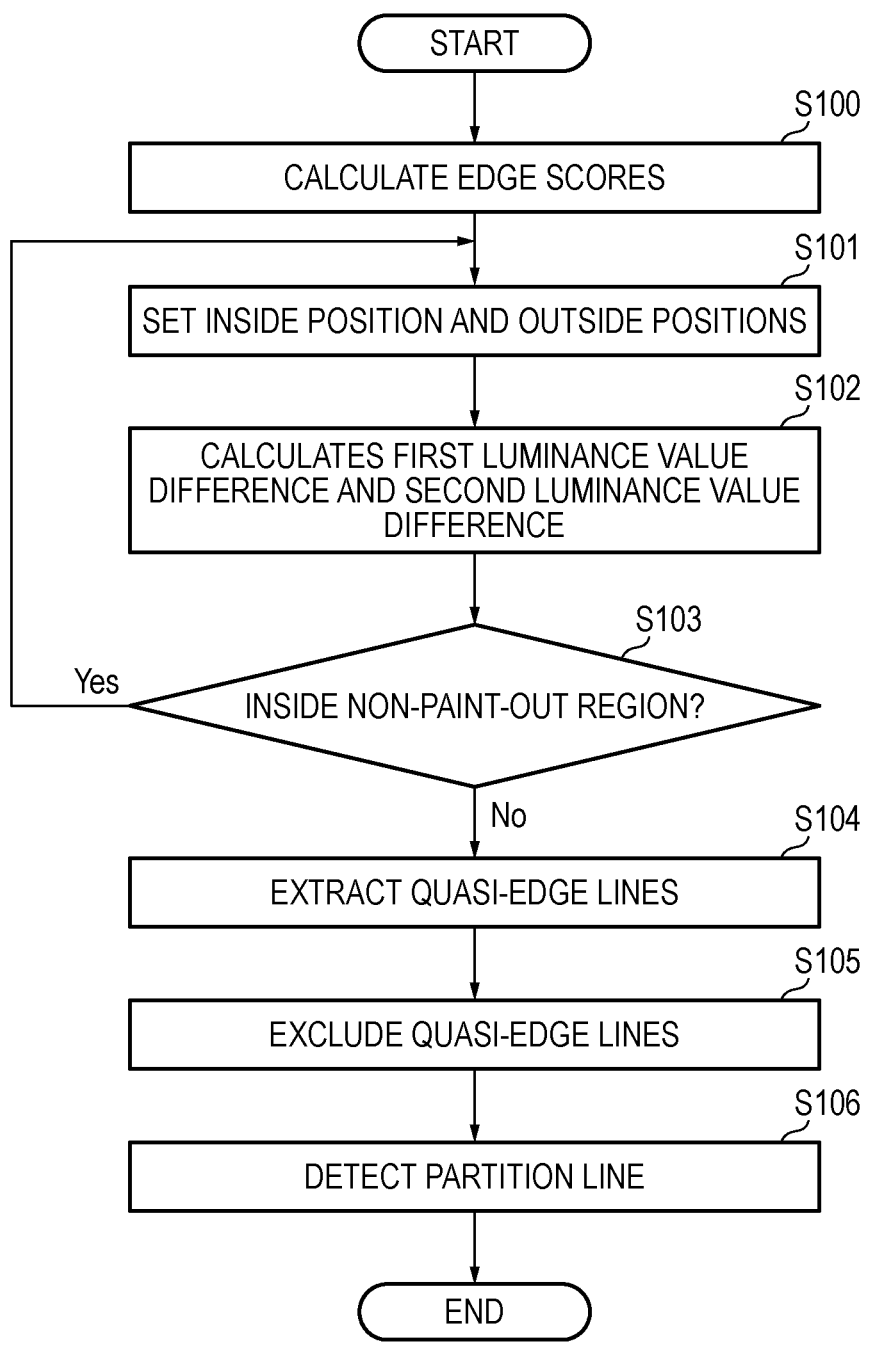
FIG. 5 is a flowchart showing a partition line detection process.

Next, a partition line detection process according to the embodiment will be described with reference to FIG. 5. FIG. 5 is a flowchart showing the partition line detection process. In the following, it is assumed that partition line candidates Lp have already been selected.

At step S100, the image processing device 1 calculates edge scores of edge lines that constitute partition line candidates Lp, respectively. That is, the image processing device 1 a first prescribed luminance value difference and a second prescribed luminance value difference which are threshold values.

At step S101, the image processing device 1 sets an inside position PA and outside positions PB and PC. More specifically, the image processing device 1 sets an inside position PA and outside positions PB and PC on a straight line that is perpendicular to the partition line candidates Lp. In executing step S101 next time, the image processing device 1 shifts the straight line that is perpendicular to the partition line candidates Lp by a prescribed interval toward the side opposite to the vehicle C and sets a new inside position PA and new outside positions PB and PC on that straight line.

At step S102, the image processing device 1 calculates a first luminance value difference between a luminance value at the inside position PA and a luminance value at the outside position PB and a second luminance value difference between the luminance value at the inside position PA and a luminance value at the outside position PC.

At step S103, the image processing device 1 judges whether the inside position PA is located inside a non-paint-out region Rn.

If the inside position PA is located outside the non-paint-out region Rn (S103: no), at step S104 the image processing device 1 extracts quasi-edge lines Lf. More specifically, if the inside position PA is located outside the non-paint-out region Rn, the image processing device 1 extracts, as quasi-edge lines Lf, portions, located closer to the vehicle C than the straight line including the inside position PA at the current step is, of the edge lines of the respective partition line candidates Lp.

At step S105, the image processing device 1 excludes the quasi-edge lines Lf from the edge lines constituting the partition line candidates Lp, respectively. At step S106, the image processing device 1 detects a partition line LC on the basis of the partition line candidates Lp from which the respective quasi-edge lines Lf have been excluded.

If the inside position PA is located inside the non-paint-out region Rn (S103: yes), the process returns to step S101, where the image processing device 1 sets a new inside position PA and new outside positions PB and PC.

If the portions concerned of respective partition line candidates Lp form a non-paint-out region Rn, the image processing device 1 excludes quasi-edge lines Lf that form the non-paint-out region Rn from the respective partition line candidates Lp. The image processing device 1 detects a partition line LC on the basis of the partition line candidates Lp from which the respective quasi-edge lines Lf have been excluded.

With this measure, the image processing device 1 can detect a partition line LC in a state that the quasi-edge lines Lf corresponding to the respective working lines are excluded. As a result, the image processing device 1 can detect a partition line LC correctly.

The image processing device 1 determines a parking frame PS on the basis of the partition line LC from which the quasi-edge lines Lf are excluded and determines a stop position of the vehicle C on the basis of the detected parking frame PS.

As a result, the image processing device 1 can determine a stop position of the vehicle C correctly.

The image processing device 1 excludes, from edge lines Lf constituting respective partition line candidates Lp, quasi-edge lines Lf that form a non-paint-out region Rn if the luminance value difference between a luminance value at an inside position PA inside a non-paint-out region Rn and a luminance value at a corresponding outside position PB or PC is smaller than a prescribed luminance value difference.

With this measure, the image processing device 1 can exclude the quasi-edge lines Lf corresponding to working lines from the partition line candidates Lp, respectively, and hence can detect a partition line LC correctly.

The image processing device 1 excludes, from edge lines Lf constituting respective partition line candidates Lp, quasi-edge lines Lf that form a non-paint-out region Rn if a first luminance value difference between a luminance value at an inside position PA and a luminance value at an outside position PB is smaller than a first prescribed luminance value difference or a second luminance value difference between the luminance value at the inside position PA and a luminance value at an outside position PC is smaller than a second prescribed luminance value difference.

With this measure, the image processing device 1 can exclude the quasi-edge lines Lf that form the non-paint-out region Rn from the respective partition line candidates Lp even in a case that a luminance value at one of two outside positions PA and PB that are located on the two respective sides of the inside position PA cannot be detected. As a result, the image processing device 1 can detect a partition line LC correctly.

The image processing device 1 excludes, from partition line candidates Lp, quasi-edge lines Lf that are portions, located closer to the vehicle C than an inside position PA is, of edge lines constituting the respective partition line candidates Lp if a first luminance value difference between a luminance value at the inside position PA and a luminance value at an outside position PB is larger than or equal to a first prescribed luminance value difference.

With this measure, the image processing device 1 can exclude the quasi-edge lines Lf corresponding to working lines from the partition line candidates Lp, respectively, and hence can detect a partition line LC correctly.

Next, image processing devices according to modifications will be described.

If an inside position PA is newly judged to be located outside a non-paint-out region Rn at a current step, an image processing device according to a modification extracts, as quasi-edge lines Lf, portions, located closer to the vehicle C than a straight line including an inside position PA that was judged to be located inside the non-paint-out region Rn at the preceding step is, of edge lines constituting respective partition line candidates Lp. For example, referring to FIG. 4, this image processing device extracts, as quasi-edge lines Lf, the portions, located closer to the vehicle C than the straight line located at the position S2, of the edge lines constituting the respective partition line candidates Lp.

Configured as described above, the image processing device according to this modification can exclude at least part of edge lines Lf corresponding to working lines from the partition line candidates Lp, respectively.

If an inside position PA is newly judged to be located outside a non-paint-out region Rn at a current step, an image processing device according to another modification moves the position of the straight line that is perpendicular to partition line candidates Lp back to the side of the vehicle C and judges whether a new inside position PA is located inside the non-paint-out region Rn.

More specifically, if an inside position PA is newly judged to be located outside a non-paint-out region Rn at a current step, this image processing device sets a new straight line (that is perpendicular to partition line candidates Lp) between the straight line position that is set in the current step and a straight line position that was set at the preceding step and sets an inside position PA and outside positions PB and PC on the new straight line. For example, this image processing device continues to execute the process while shifting the position of the straight line that is perpendicular to the partition line candidates Lp by an interval that is shorter than the prescribed interval.

Configured as described above, the image processing device according to this modification can extract quasi-edge lines Lf starting from positions that are closer to the boundaries between a partition line LC and working lines, respectively, and hence can extract quasi-edge lines Lf more correctly. As a result, this image processing device 1 can detect a partition line LC more correctly.

When quasi-edge lines Lf are extracted, an image processing device according to still another modification subjects information relating to the extracted quasi-edge lines Lf to time-series management. For example, the information relating to the extracted quasi-edge lines Lf is subjected to time-series management by the parking frame managing unit 27 (an example of the term "managing unit" used in the claims) together with information relating to a parking frame PS. For example, the information relating to the extracted quasi-edge lines Lf is managed in the form of apex coordinates.

The image processing device according to this modification eliminates quasi-edge lines Lf from partition line candidates Lp that are extracted from newly acquired image data on the basis of quasi-edge lines Lf whose information is being managed. More specifically, this image processing device detects a partition line LC by excluding portions, corresponding to the quasi-edge lines Lf whose information is being managed, of edge lines constituting partition line candidates Lp extracted from newly acquired from image data.

For example, in a case that one outside region R2 is of a road surface that is made dark by a shadow of a building, the other outside region R2 is of a road surface that is made dark temporarily by a shadow of the vehicle C, and an inside region R1 is bright without being affected by these two shadows, large luminance value differences occur between a luminance value at an inside position in a non-paint-out region Rn and luminance values at outside positions PB and PC. Thus, in this case, quasi-edge lines Lf may not be extracted from partition line candidates Lp extracted from newly acquired image data.

In contrast, in this image processing device, since information relating to quasi-edge lines Lf is subjected to time-series management, quasi-edge lines Lf can be eliminated from the partition line candidates Lp extracted from the newly acquired image data on the basis of the quasi-edge lines Lf whose information is managed. For example, this image processing device estimates a movement distance of the vehicle C on the basis of sensor values received from the sensor group Sc and estimates apex coordinates of actual quasi-edge lines Lf on the basis of the estimated movement distance and information relating to past quasi-edge lines Lf. This image processing device 1 excludes the quasi-edge lines Lf from partition line candidates Lp of newly acquired image data on the basis of the estimated apex coordinates of the actual quasi-edge lines Lf.

Configured as described above, the image processing device according to this modification can exclude quasi-edge lines Lf in newly acquired image data.

An image processing device according to yet another modification judges that an inside position PA is located inside a non-paint-out region Rn if a first luminance value difference is smaller than a first prescribed luminance value difference and a second luminance value difference is smaller than a second prescribed luminance value difference.

An image processing device according to a further modification judges whether an inside position PA is located inside a non-paint-out region Rn using a luminance value difference between a luminance value at the inside position PA and a luminance value at one of outside positions PB and PC.

That is, this image processing device excludes, as quasi-edge lines Lf, edge lines that form a non-paint-out region Rn if a luminance value difference between a luminance value at an inside position PA and a luminance value at a selected one of outside positions PA and PB is smaller than a corresponding prescribed luminance value difference (first prescribed luminance value difference or second prescribed luminance value difference).

Configured as described above, the image processing device according to this modification can exclude quasi-edge lines Lf corresponding to working lines from partition line candidates Lp, respectively, and detect a partition line LC correctly.

It is noted that the processing of excluding quasi-edge lines Lf from respective partition line candidates Lp may be performed by the partition line candidate detection unit 23.

Those skilled in art could easily conceive further advantageous measures and modifications. Broader modes of the invention are therefore not restricted to the particular and typical embodiment that has been described above in detail. Thus, various changes can be made without departing from the comprehensive spirit and scope of the invention as defined by the attached claims and its equivalents.

LIST OF REFERENCE SYMBOLS

1: Image processing device
21: Line segment extraction unit (extraction unit)
23: Partition line candidate detection unit (selection unit)
25: Partition line detection unit
27: Parking frame managing unit (managing unit)
28: Stop position determining unit
40: Setting unit
41: Calculation unit
42: Judging unit
44: Exclusion unit
45: Detection unit
LC: Partition line
Lf: Quasi-edge line
Lp: Partition line candidates (edge line pair)
PS: Parking frame

What is claimed is:

1. An image processing device comprising:
    an extraction unit which extracts edge lines based on image data taken by an imaging device by shooting a neighborhood of a vehicle;
    a selection unit which selects, as a pair of edge lines, edge lines that satisfy a prescribed condition from the extracted edge lines;
    an exclusion unit which, in a case where a non-paint-out region exists between the pair of edge lines, excludes quasi-edge lines that form the non-paint-out region from the pair of edge lines; and
    a detection unit which detects a partition line that partitions a parking frame based on the pair of edge lines from which the quasi-edge lines are excluded.

2. The image processing device according to claim 1, further comprising:
    a parking frame detection unit which detects the parking frame based on the partition line detected by the detection unit; and
    a stop position determining unit which determines a stop position of the vehicle based on the detected parking frame.

3. The image processing device according to claim 1, further comprising a calculation unit which calculates a luminance value difference between a luminance value at an inside position located between the pair of edge lines and a luminance value at an outside position located on an opposite side of one of the pair of edge lines to the inside position,
    wherein the exclusion unit excludes, from the pair of edge lines, the quasi-edge lines that form the non-paint-out region in which the luminance value difference is smaller than a prescribed luminance value difference.

4. The image processing device according to claim 2, further comprising a calculation unit which calculates a luminance value difference between a luminance value at an inside position located between the pair of edge lines and a luminance value at an outside position located on an opposite side of one of the pair of edge lines to the inside position,
    wherein the exclusion unit excludes, from the pair of edge lines, the quasi-edge lines that form the non-paint-out region in which the luminance value difference is smaller than a prescribed luminance value difference.

5. The image processing device according to claim 3, wherein the exclusion unit excludes, from the pair of edge lines, the quasi-edge lines that form the non-paint-out region in which a luminance value difference between the luminance value at the inside position and a luminance value at one of two of the outside positions located outside the inside position is smaller than the prescribed luminance value difference.

6. The image processing device according to claim 4, wherein the exclusion unit excludes, from the pair of edge lines, the quasi-edge lines that form the non-paint-out region in which a luminance value difference between the luminance value at the inside position and a luminance value at one of two of the outside positions located outside the inside position is smaller than the prescribed luminance value difference.

7. The image processing device according to claim 3, wherein, in a case where the luminance value difference is larger than or equal to the prescribed luminance value difference, the exclusion unit excludes, from the pair of edge lines, as the quasi-edge lines that form the non-paint region, portions, located closer to the vehicle than the inside position whose luminance value is calculated, of the pair of edge lines.

8. The image processing device according to claim 4, wherein, in a case where the luminance value difference is larger than or equal to the prescribed luminance value difference, the exclusion unit excludes, from the pair of edge lines, as the quasi-edge lines that form the non-paint region, portions, located closer to the vehicle than the inside position whose luminance value is calculated, of the pair of edge lines.

9. The image processing device according to claim 5, wherein, in a case where the luminance value difference is larger than or equal to the prescribed luminance value difference, the exclusion unit excludes, from the pair of edge lines, as the quasi-edge lines that form the non-paint region, portions, located closer to the vehicle than the inside position whose luminance value is calculated, of the pair of edge lines.

10. The image processing device according to claim 6, wherein, in a case where the luminance value difference is larger than or equal to the prescribed luminance value difference, the exclusion unit excludes, from the pair of edge lines, as the quasi-edge lines that form the non-paint region, portions, located closer to the vehicle than the inside position whose luminance value is calculated, of the pair of edge lines.

11. The image processing device according to claim 3, wherein, in a case where the luminance value difference is larger than or equal to the prescribed luminance value difference, the calculation unit newly calculates the luminance value difference for an inside position that is located between the inside position at which a luminance value has been calculated at a current step and the inside position at which a luminance value was calculated at a preceding step.

12. The image processing device according to claim 4, wherein, in a case where the luminance value difference is larger than or equal to the prescribed luminance value difference, the calculation unit newly calculates the luminance value difference for an inside position that is located between the inside position at which a luminance value has been calculated at a current step and the inside position at which a luminance value was calculated at a preceding step.

13. The image processing device according to claim 5, wherein, in a case where the luminance value difference is larger than or equal to the prescribed luminance value difference, the calculation unit newly calculates the luminance value difference for an inside position that is located between the inside position at which a luminance value has been calculated at a current step and the inside position at which a luminance value was calculated at a preceding step.

14. The image processing device according to claim 6, wherein, in a case where the luminance value difference is larger than or equal to the prescribed luminance value difference, the calculation unit newly calculates the luminance value difference for an inside position that is located between the inside position at which a luminance value has been calculated at a current step and the inside position at which a luminance value was calculated at a preceding step.

15. The image processing device according to claim 7, wherein, in a case where the luminance value difference is larger than or equal to the prescribed luminance value difference, the calculation unit newly calculates the luminance value difference for an inside position that is located between the inside position at which a luminance value has been calculated at a current step and the inside position at which a luminance value was calculated at a preceding step.

16. The image processing device according to claim 1, further comprising a managing unit which subjects information relating to the quasi-edge lines to time-series management,
   wherein the detection unit detects a partition line using the managed information relating to the quasi-edge lines.

17. The image processing device according to claim 2, further comprising a managing unit which subjects information relating to the quasi-edge lines to time-series management,
   wherein the detection unit detects a partition line using the managed information relating to the quasi-edge lines.

18. The image processing device according to claim 3, further comprising a managing unit which subjects information relating to the quasi-edge lines to time-series management,
   wherein the detection unit detects a partition line using the managed information relating to the quasi-edge lines.

19. The image processing device according to claim 4, further comprising a managing unit which subjects information relating to the quasi-edge lines to time-series management,
   wherein the detection unit detects a partition line using the managed information relating to the quasi-edge lines.

20. An image processing method comprising:
   extracting edge lines based on image data taken by an imaging device by shooting a neighborhood of a vehicle;
   selecting, as a pair of edge lines, edge lines that satisfy a prescribed condition from the extracted edge lines;
   in a case where a non-paint-out region exists between the pair of edge lines, excluding quasi-edge lines that form the non-paint-out region from the pair of edge lines; and
   detecting a partition line that partitions a parking frame based on the pair of edge lines from which the quasi-edge lines are excluded.

* * * * *